United States Patent Office 3,489,692
Patented Jan. 13, 1970

3,489,692
PREPARATION OF CATALYSTS
Kenneth Hugh Bourne, Woking, and John Stanley Elkins, Laleham, England, assignors to The British Petroleum Company Limited, a corporation of England
No Drawing. Filed Aug. 11, 1967, Ser. No. 659,872
Claims priority, application Great Britain, Aug. 18, 1966, 36,981/66
Int. Cl. B01j 11/26, 11/22; C07b 1/00
U.S. Cl. 252—466  6 Claims

ABSTRACT OF THE DISCLOSURE

Catalysts of an iron group metal on a support are prepared by ion-exchanging metal cations onto the support and reducing the cations to elemental metal in the presence of minor amount of a different iron group metal, a platinum group metal, copper, or rhenium. The presence of the other metal assists the reduction without significantly changing the characteristics of the catalyst. The preferred catalytic metal is nickel; the preferred amount of the metal assisting the reduction is 1–25 moles/mole of catalytic metal and it may be added as a metal compound by impregnation. Preferred supports are refractory inorganic oxides of Groups II, III and IV, particularly silica.

The reduction is preferably carried out at 100–500° C. in a stream of hydrogen.

---

This invention relates to the preparation of catalysts having an elemental metal on a support prepared by an ion-exchange technique.

In the preparation of catalysts comprising elemental metals on a support the technique normally involves treating the support with a compound of the metal and then reducing the compound to elemental metal. The compound may be added to the support by, for example, impregnation, co-precipitation, dry or wet milling or ion exchange. "Ion exchange" means the replacement of hydrogn ions in the original support by metal cations so that the metal is chemically combined with the oxide and not merely admixed with the oxide. A particularly suitable technique of ion-exchange is described in U.K. application 22,976/65, involving contacting a refractory inorganic oxide of an element of Group II, III or IV of the Periodic Table containing hydrogen atoms with an aqueous alkaline solution so that the hydrogen is exchanged for alkaline cations, simultaneously or subsequently contacting the oxide with a solution containing cations of a metal of Group I$b$, II$b$, IV$b$, V$b$, VI, VII or VIII of the Periodic Table so that the alkaline cations are exchanged for metal cations, thereafter washing with water to remove substantially all the chemically uncombined alkali and metal cations and drying the composite so formed. The application emphasises that ion-exchanged components are not readily reduced by a simple treatment with hydrogen and proposes a reduction technique of removing combined water associated with the metal cations and heating the inorganic oxide containing the metal cations in a reducing atmosphere.

Reduced ion-exchanged metal catalysts have the metal distributed over the support in a very fine state of subdivision and hence show advantages over more conventional catalysts in use. A method of assisting the reduction of the metal cations would thus be particularly useful.

According to the present invention, therefore, a process for the preparation of catalysts having an iron group elemental metal on a support by the steps of forming a composite of the support and iron group metal cations by an ion-exchange technique and reducing the cations to elemental metal is characterised in that the cations are reduced in the presence of a minor amount of a metal which is a different iron group metal, a platinum group metal, copper or rhenium.

The iron group metal added by ion exchange is the main catalytic component and will hereinafter be referred to as the catalytic metal. The other metal present is there to assist the reduction of the ion-exchanged iron group metal and will be referred to as the reducing metal. The term "minor amount" of the reducing metal means less than 50 mol percent of the catalytic metal, being preferably from 1 to 25, and particularly 1–10, mol percent of the catalytic metal. Thus although this other metal may form part of the finished catalyst its amount in relation to the catalytic metal will be small and will not cause a major change in the characteristics of the catalyst.

The reducing metal may be added to the composite as finely divided metal but there may be difficulties in getting good admixture and efficient use of the metal with this technique. Preferably, therefore, the reducing metal is added by impregnation using a water-soluble compound of the metal, for example a salt. When using this technique the compound is itself reduced to metal during the reduction stage. Without being bound by any theory, it is postulated that the reducing metals have the common features of being capable of adsorbing hydrogen and of being relatively easily formed by reduction. They thus assist the reduction of the catalytic metal by being preferentially reduced, if not already in elemental form, and then adsorbing hydrogen chemically associated with the catalytic metal cations, thereby making these cations more susceptible to reduction.

The addition of the reducing metal, whether as metal or metal compound may conveniently be made at room temperature.

The iron group metals are iron, cobalt and nickel, the latter being preferred as the catalytic metal. The term "platinum group metal" means platinum, iridium, osmium, palladium, rhodium, or ruthenium, platinum or palladium being preferred.

The support is preferably a hydrogen-containing refractory inorganic oxide of an element of Group II, III or IV of the Periodic Table. It may be a single oxide or a mixture of oxides and examples of suitable supports are silica, alumina, magnesia and mixtures thereof.

Ion-exchange techniques involve contacting the support with a water-soluble compound of the catalytic metal followed by a water wash to remove metal cations which have not exchanged with hydrogen ions on the support. This washing must be carried out while the metal cations are still in a water-soluble state (i.e. before any step which would convert uncombined metal cations to a water insoluble state). This washing step distinguishes the process from the conventional impregnation technique in which reduction follows on the impregnation without an intermediate water wash.

The water used for washing is desirably free from ions other than those already present on the composite and initially, therefore, de-ionised water may be used. Removal of substantially all metal cations not chemically bound to the support will occur when the washing is continued until no further cations are removed from the catalyst. This can readily be determined by analysis of the effluent from the washing. Other conditions for the washing are not critical, affecting only the speed of the catalyst preparation rather than the final result. Suitably the temperature may be in the range 15° C. to the boiling point of water at the pressure used, preferably 15 to 100° C. Atmospheric pressure is preferred, but pressures above or below atmospheric are also suitable. The quantity of water used is suitably 2 ml. to 100 ml. per ml. of catalyst and the length of time of the washing may be from 10 minutes to 10 hours.

When the support does not contain strong protons it may be first contacted with an aqueous alkaline solution to exchange the hydrogen ions for alkaline cations and then treated with the solution containing the catalytic metal cations as described in the complete specification of U.K. patent application No. 22,976/65.

The amount of catalytic metal in the catalyst will depend on the support used and the number of active sites on it capable of exchanging ions, but in general with the preferred refractory inorganic oxides the amount is likely to be relatively low and within the range 0.1 to 5 percent wt.

With an ion-exchanged catalyst the metal cation cannot be removed or disturbed by the use of an aqueous solution to add the compound of the hydrogen-adsorbing metal because it is not water soluble.

The reducing metal can be, therefore, and preferably is, added to the catalyst after the ion-exchange and water washing. Some of the reducing metals are themselves capable of ion-exchange and although they may, if desired, be added to the catalyst before or simultaneously with the ion-exchange this may reduce the amount of catalytic metal that can be added by ion-exchange.

After the addition of the reducing metal as described above the catalytic metal cation is reduced by heating in a reducing atmosphere, which is preferably a stream of hydrogen gas. Since the presence of the reducing metal assists the reduction, the use of high temperatures which might sinter the support or the catalytic metal can be avoided and the preferred temperatures are 100° to 500° C., preferably 150–350° C. The time will depend on the temperature used, being rather longer for the lower temperatures, but may conveniently be in the range 1 to 24 hours, particularly 1–10 hours. The reduction is preferably carried out in a water-vapour free atmosphere.

The reduced elemental metal catalysts may be used for any of the purposes for which they are known to be useful. As is well known the catalysts of an ion group metal on a support have activity, inter alia, for hydrogenation, dehydrogenation, desulphurisation, hydrocracking, and steam reforming. Particularly suitable uses for elemental nickel catalysts are described in the complete specifications of U.K. patent application Nos. 41,538/65 and 1,432/66.

The invention is illustrated by the following examples:

EXAMPLE 1

1 litre of silica gel having a surface area of 550 m.²/g. was treated with 1500 ml. of saturated sodium bicarbonate solution for 10 minutes. The residual solution was decanted off and the treatment repeated. After decanting off the second solution the composite was washed with 4 aliquots of 300 ml. deionised water. Then the composite was treated twice with 1500 ml. of N/10 nickel nitrate solution for 10 minutes and washed with 8 aliquots of 300 ml. deionised water. The ion-exchanged composite, which was dried at 110° C., contained 1.47% wt. of nickel.

Portions of the catalyst were then treated with solutions of metal salts and with platinum black. The salt solutions were used in sufficient quantity just to wet the catalyst and the platinum black was added by mechanical admixture.

The catalysts were dried at 110° C. and then reduced at 300° C. in a stream of hydrogen flowing at 4000 v./v./hr. for 4 hours.

The salts used, the molar concentrations of metals with respect to the nickel and the extent of reduction as compared with a reference sample containing no metal are given in Table 1 below.

TABLE 1

| Reducing metal used | Concentration (mole percent of Ni) | Percent of Ni reduced | Promotion factor |
| --- | --- | --- | --- |
| Salt: | | | |
| None | 0 | 17 | 1.0 |
| FeCl₃ | 2 | 23 | 1.35 |
| FeCl₃ | 4 | 25 | 1.47 |
| PtCl₂ | 2.75 | 34 | 2.0 |
| Pt * | 22.5 | 22 | 1.3 |
| PdCl₂ | 2 | 53 | 3.2 |
| Co(NO₃)₂ | 2 | 52 | 1.9 |
| AgNO₃ | 2 | 13.3 | 0.8 |
| Cr(NO₃)₃ | 2 | 15 | 0.9 |
| MgCl₂ | 2 | 16.9 | 1.0 |

* As Platinum black.

The table shows that iron, cobalt and palladium salts, and platinum black promote the reduction of nickel in accordance with the invention. The last three results show metal salts which do not give this effect.

EXAMPLE 2

100 ml. of 60–100 BSS mesh silica gel were treated with 200 ml. of 0.88 SG ammonia solution was then Soxhlet extracted. The silica gel was then contacted with 500 ml. of cobalt sulphate solution for 5 minutes and washed with 60 aliquots of deionized water, each of 500 ml. The cobalt-silica composite after drying at 110° C. contained 4.02% wt. of cobalt.

The cobalt-silica composite was then divided into four parts. Three parts were treated with solutions of different metal salts so that 3 mols of metal were absorbed/mol of cobalt, there being no excess solution. One part was kept as a control.

The four composites were then reduced in a stream of hydrogen at 1000 GHSV. The composites were heated up to 550° C. in half an hour and held at that temperature for 2 hours. After cooling each composite was analysed for elemental cobalt. The metal solutions used and the extent of reduction of the cobalt are given in Table 2 below.

TABLE 2

| | Percent reduction of cobalt | Promotion factor |
| --- | --- | --- |
| Promoting metal salt: | | |
| Blank (control) | 1.1 | |
| FeCl₃ | 54.0 | 49 |
| PdCl₂ | 73.3 | 67 |
| Ni(NO₃)₂ | 4.1 | 3.7 |

The table shows that ion-exchanged cobalt is very difficult to reduce on its own, but that reduction is greatly assisted by the promoting metals.

What we claim is:

1. A process for the preparation of catalysts having a support and, on the support, an iron group elemental metal as the catalytic metal and main catalytic component, comprising the steps of forming a composite of cations of the catalytic metal and a support which is a hydrogen-containing refractory inorganic oxide of an element of Group II, III or IV of the Periodic Table, by ion-exchange of cations of the catalytic metal with hydrogen ions of the support and reducing the catalytic metal cations to elemental metal by heating the composite in a reducing atmosphere at 100 to 500° C. and in the presence of from 1 to 25 mol percent of the iron group catalytic metal of a reducing metal which is a different iron group metal, a platinum group metal, copper or rhenium.

2. A process as claimed in claim 1 wherein the iron group catalytic metal is nickel.

3. A process as claimed in claim 1 wherein the amount of reducing metal is from 1 to 10 mol percent of the iron group catalytic metal.

4. A process as claimed in claim 1 wherein the reducing metal is added to the catalyst by impregnation as a water-soluble compound.

5. A process as claimed in claim 1 wherein the reducing metal is added after the ion-exchange of the iron group catalytic metal.

6. A process as claimed in claim 1 wherein the reduction is effected by heating in a reducing atmosphere at 150 to 350° C.

References Cited

UNITED STATES PATENTS

| | | | |
|---|---|---|---|
| 3,389,965 | 6/1968 | Ruiter | 23—212 |
| 2,955,090 | 10/1960 | Richards | 252—455 |
| 3,143,511 | 8/1964 | Bichard | 252—466 |
| 3,205,178 | 9/1965 | Orzechowski | 252—429 |
| 3,371,050 | 2/1968 | Taylor | 252—459 |
| 3,293,170 | 12/1966 | Gobel | 208—111 |

DANIEL E. WYMAN, Primary Examiner

PHILIP M. FRENCH, Assistant Examiner

U.S. Cl. X.R.

252—459, 460, 461, 463